(No Model.)
E. JAEGER.
BAKING APPARATUS.
No. 333,229. Patented Dec. 29, 1885.
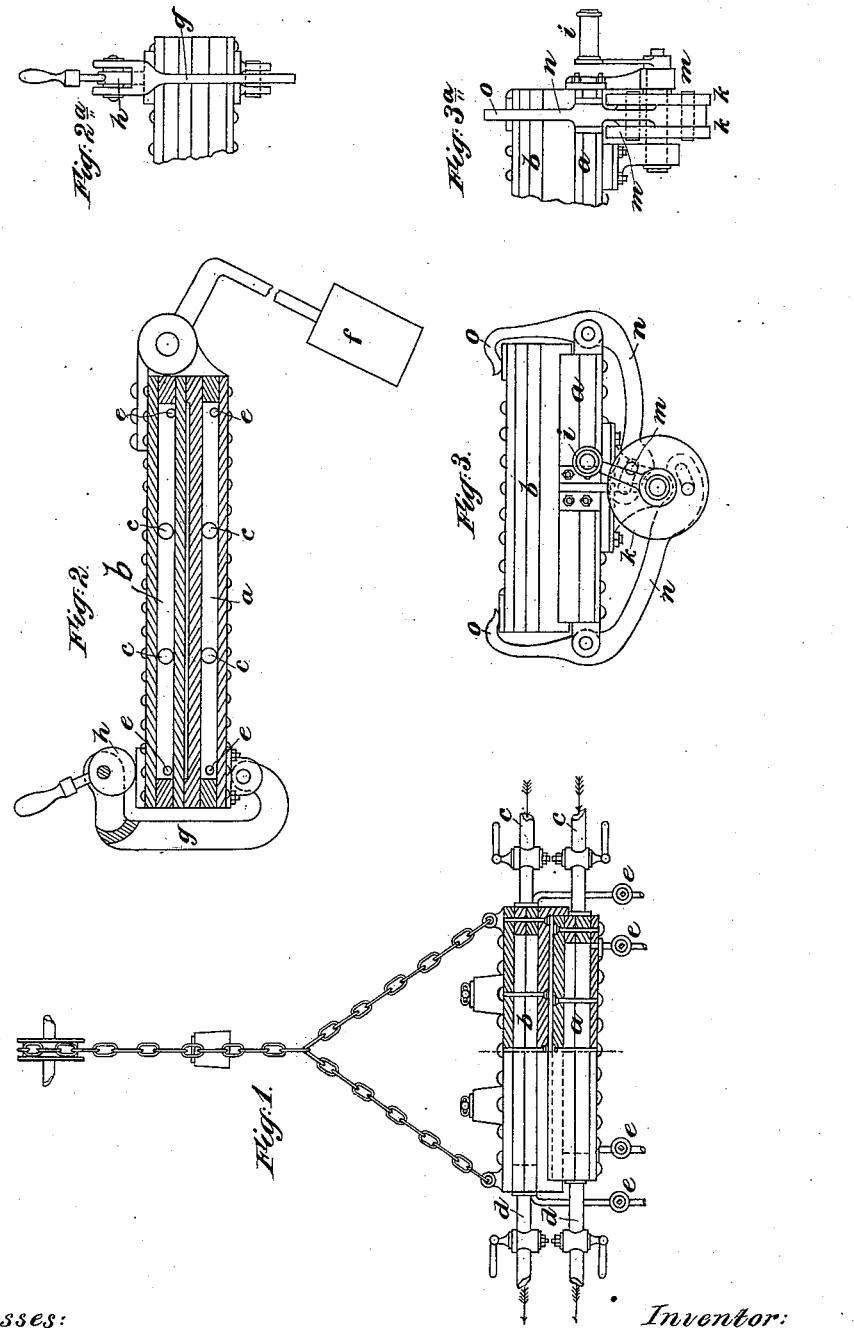
Witnesses:
Inventor:

United States Patent Office.

EMIL JAEGER, OF PLAUEN, NEAR DRESDEN, SAXONY, GERMANY.

BAKING APPARATUS.

SPECIFICATION forming part of Letters Patent No. 333,229, dated December 29, 1885.

Application filed April 21, 1884. Serial No. 128,796. (No model.) Patented in Germany June 27, 1883, No. 26,945; in Belgium July 9, 1883, No. 61,972; in France July 9, 1883, No. 156,465; in England July 9, 1883, No. 3,387; in Luxemburg July 10, 1883, No. 293, and in Austria-Hungary September 1, 1884.

*To all whom it may concern:*

Be it known that I, EMIL JAEGER, of Plauen, near Dresden, Saxony, Germany, have invented certain new and useful Improvements in Baking Apparatus, of which the following is a full, clear, and exact description.

The invention relates to the employment of the heat from steam of suitable pressure for baking in forms or molds. I make use of high-pressure steam, and I employ baking-forms the walls of which are made hollow for the passing of the steam. If the heat of such passing steam is allowed to act for a sufficient time upon the dough or paste inclosed in the form or mold, the same effect will be attained as with the action of heat of fire on the outer surface of the forms.

The repeated trials which I have made with steam-baking process in baking wafers or waffles have proved that with steam of six atmospheres' pressure the baking process will be effected in the same time as if baking on fire, this high pressure of course requiring the forms with hollow walls to be made of strong iron or steel plates, through which the action of the heat of steam upon the paste must take place.

The accompanying drawings form a part of this specification and represent what I consider the best means of carrying out the invention.

Figure 1 shows the device for baking with steam in its simplest form. It is an elevation, partly in section. Figs. 2 and 2ª represent a modification. Fig. 2 is a vertical section. Fig. 2ª is an elevation of a portion. Figs. 3 and 3ª show another modification. Fig. 3 is an elevation. Fig. 3ª is an elevation of a portion at right angles to Fig. 3.

Similar letters of reference indicate corresponding parts in all the figures where they appear.

Referring to Fig. 1 and the letters of reference marked thereon, the lower hollow plate, $a$, rests upon any suitable frame or other support. (Not shown.) The upper hollow plate, $b$, is made movable, which in this instance is done by means of chains and pulleys and counter-weights.

In order to firmly close the plates $a$ and $b$ upon each other, the upper one may be loaded with weights. Into these hollow plates I cause high-pressure steam to enter by the pipes $c$, which steam, together with the condensed steam, escapes through pipes $d$. The water may also be carried off by extra pipes $e$. The dough or paste is, when plate $b$ is raised, poured or spread upon plate $a$; then the plate $b$ is lowered and loaded with weights, and steam is caused to pass through the hollow plates until the baking process is completed.

It is well understood that the hollow plates should be well and sufficiently preheated by steam passing through them before the paste is poured on. After removing the weights and raising plate $b$ the ready-baked cakes, wafers, waffles, biscuits, &c., may be easily removed from $a$. Steam should continue to pass for the renewed baking after removing the ready-baked cake. The pipes connected to the movable plate $b$ should be flexible.

In Figs. 2 and 2ª corresponding hollow plates, $a$ and $b$, are shown united at the rear side by a hinge, so that $b$ may be turned up, which may be facilitated by a counter-weight, $f$.

Hinged to the plate $a$ are clamps $g$, which may be turned up or down. These clamps carry in their forked ends eccentric disks $h$, which may be turned by handles, so as to firmly close the hollow plates $a$ $b$ together. In Figs. 3 and 3ª this closure is effected by a double disk, K, the axle of which is carried in bearings underneath the plate $a$. The axle of said disk is provided with a crank or handle, $i$. The pins $m$ $m$, connecting the disks K, extend through curved slots formed in the one end of the levers $n$ $n$, which are pivoted at any suitable place. The upper ends, $o$ $o$, of the lever take upon the upper surface of the plate $b$, so that this plate, if the crank or handle $i$ is properly turned, is firmly closed upon plate $a'$. In this form the plate $b$ may also be hinged and balanced. The means for firmly closing such plates one upon the other may be varied, and the device for raising or lowering the upper plate or for turning the same may be replaced by other equivalent devices without departing from the main feature of this invention. It will be well to cover the surfaces of the hollow plates which are exposed outside when in use with any well-known material which is a bad conductor of heat, so as to reduce the cooling influence of the outer air.

It is obvious that I may depart from the straight form of the hollow molds, as they may be of curved or any other shape. For example, the two molds or forms between which the baking process is carried on may be both curved, or the one may be straight and the other curved, so as to suit the form of cakes which are to be baked.

I claim as my invention—

1. In combination with the hollow portions $a\,b$ and means for clamping them together, the inlet-connections for steam, the outlets for water of condensation, and the vents, all controlled by separate valves or cocks, as set forth.

2. In combination with the hollow portions $a\,b$, the clamping-levers $o$, pivoted to one of said portions, the disk K, having slots, and the crank $i$, for operating both clamps simultaneously, as set forth.

In testimony whereof I have hereunto set my hand, this 23d day of June, 1883, in the presence of two subscribing witnesses.

EMIL JAEGER.

Witnesses:
 WILHELM WIESENHÜTTER,
 GEORG RICHTER.